United States Patent [19]

Sten

[11] 3,917,937

[45] Nov. 4, 1975

[54] SYSTEM FOR ESTABLISHING THE ATHWARTSHIP STABILITY OF A SHIP

[75] Inventor: Leif Ragnvald Sten, Staffanstorp, Sweden

[73] Assignee: Kommanditbolaget AB Lastfordelningsinstrument & Co., Malmo, Sweden

[22] Filed: July 6, 1973

[21] Appl. No.: 376,986

[30] Foreign Application Priority Data

July 28, 1972 Sweden.............................. 9860/72

[52] U.S. Cl. ................... 235/193; 73/65; 235/150.2
[51] Int. Cl.² ..................... G06G 7/70; G01M 1/12
[58] Field of Search ... 235/193, 184, 151.3, 151.33, 235/150.2; 73/65

[56] References Cited
UNITED STATES PATENTS

| | | | |
|---|---|---|---|
| 3,408,487 | 10/1968 | De Wilde | 235/150.2 |
| 3,441,721 | 4/1969 | Arpas | 235/150.2 |
| 3,486,017 | 12/1969 | Arseneau | 235/150.2 X |
| 3,513,300 | 5/1970 | Elfenbein | 235/150.2 |
| 3,746,844 | 7/1973 | Azum | 235/150.2 |

*Primary Examiner*—Joseph F. Ruggiero
*Attorney, Agent, or Firm*—Browne, Beveridge, DeGrandi & Kline

[57] ABSTRACT

A method of instantaneously establishing the athwartship stability of a ship with respect to such factors as the cargo in different cargo spaces, the center of gravity of the cargo and, optionally, the free surface area of any liquid in a space, in which method signals representing said factors are treated together with other signals for providing a difference signal representing the metacentric height and thus the athwartship stability of the ship.

2 Claims, 3 Drawing Figures

SYSTEM FOR ESTABLISHING THE ATHWARTSHIP STABILITY OF A SHIP

The present invention relates to a method of establishing the athwartship stability of a ship with respect to the cargo in each cargo space, the centre of gravity of the cargo and, optionally the free surface area of any liquid in a space, in which method there is generated for each space a first signal representing the cargo within said space, a second signal representing the elevation of the centre of gravity of the cargo in the vertical direction, and a third signal representing free liquid surface area and generated only when the cargo within the space is a liquid cargo having a free surface area.

For optimal loading of a ship, it should be possible to establish as simply and as quickly as possible the metacentric height with respect to different instantaneously variable cargo alternatives. Prior art methods and apparatus for satisfying this requirement have proved to be complicated, unreliable or extremely costly and have not met with approval in professional circles. The present invention has for its object to eliminate these shortcomings and to fulfil this long-felt want.

To this end, the first signals are supplied on one hand to a summing circuit for generating a signal (5) representing the deadweight of the ship and, on the other hand, to a multiplying circuit (2) together with the other signals (3) for generating signals representing the vertical moments of the different cargoes, the vertical moment signals being supplied to a summing circuit together with any third signals for generating a signal representing the total vertical deadweight moment modified with respect to free liquid surface area, if any, which signal is supplied either to a subtracting circuit together with a signal representing the metacentric position of the ship above the keel line, multiplied by the displacement of the ship, whereupon the difference signal on the output of the subtracting circuit is supplied to a dividing circuit together with a signal representing the displacement of the ship, to generate a quotient signal representing the metacentric height and thus the athwartship stability of the ship, or to a dividing circuit together with the signal representing the position of the ship's metacentric height above the keel line, whereupon the difference signal on the output of the subtracting circuit represents the metacentric height and thus the athwartship stability of the ship.

The invention will now be described in more detail, reference being had to the accompanying drawings in which.

Figure 1:
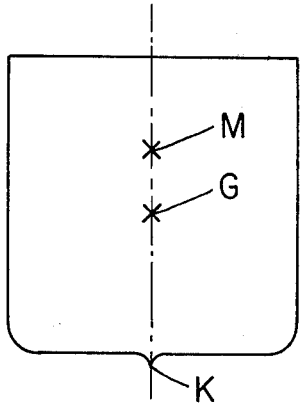
FIG. 1 is a diagrammatic cross section of a ship.

Two trade publications printed by or on behalf of Kockums, the first of which was prior to the present invention, are as follows: (1) *Kockums Loadmaster Computer* (4pages), published by Kockums Marine Equipment Sales Department, Fock, S-201, 10 Malmo 1, Sweden; (2) *Kockums Loadmaster Computer On Line*, published by Kockums Marine Equipment Sales Department of the same address as above.

The athwartship stability of a ship is equivalent to the ship's metacentric height GM that can be established in different ways and must show a positive value if the ship is to have a certain athwartship stability. The lower the metacentric height, the lower will be the athwartship stability of the ship, and when the metacentric height becomes negative, the ship has no athwartship stability at all and heels over or capsizes.

The metacentric height GM is obtained from the following equation $$GM = \overline{(A-B) - (C+D)} \qquad (1)$$
$$A = \overline{KM} \qquad (2)$$
$$B = \frac{LW \times VCG_L}{\Delta} \qquad (3)$$
$$C = \frac{VM}{\Delta} \qquad (4)$$
$$D = \frac{i}{\Delta} \qquad (5)$$
$$\Delta = LW + DW \qquad (6)$$

$\overline{KM}$ = distance between keel line and metacentre of ship
$\Delta$ = ship's displacement
$LW$ = ship's own weight
$DW$ = ship's deadweight
$VCG_L$ = lightweight's height of centre of gravity
$VM$ = sum of vertical moments with respect to keel line of all weights comprised by the deadweight
$i$ = sum of moments of inertia for all free liquid surface areas, multiplied by the respective density.

Figure 3:
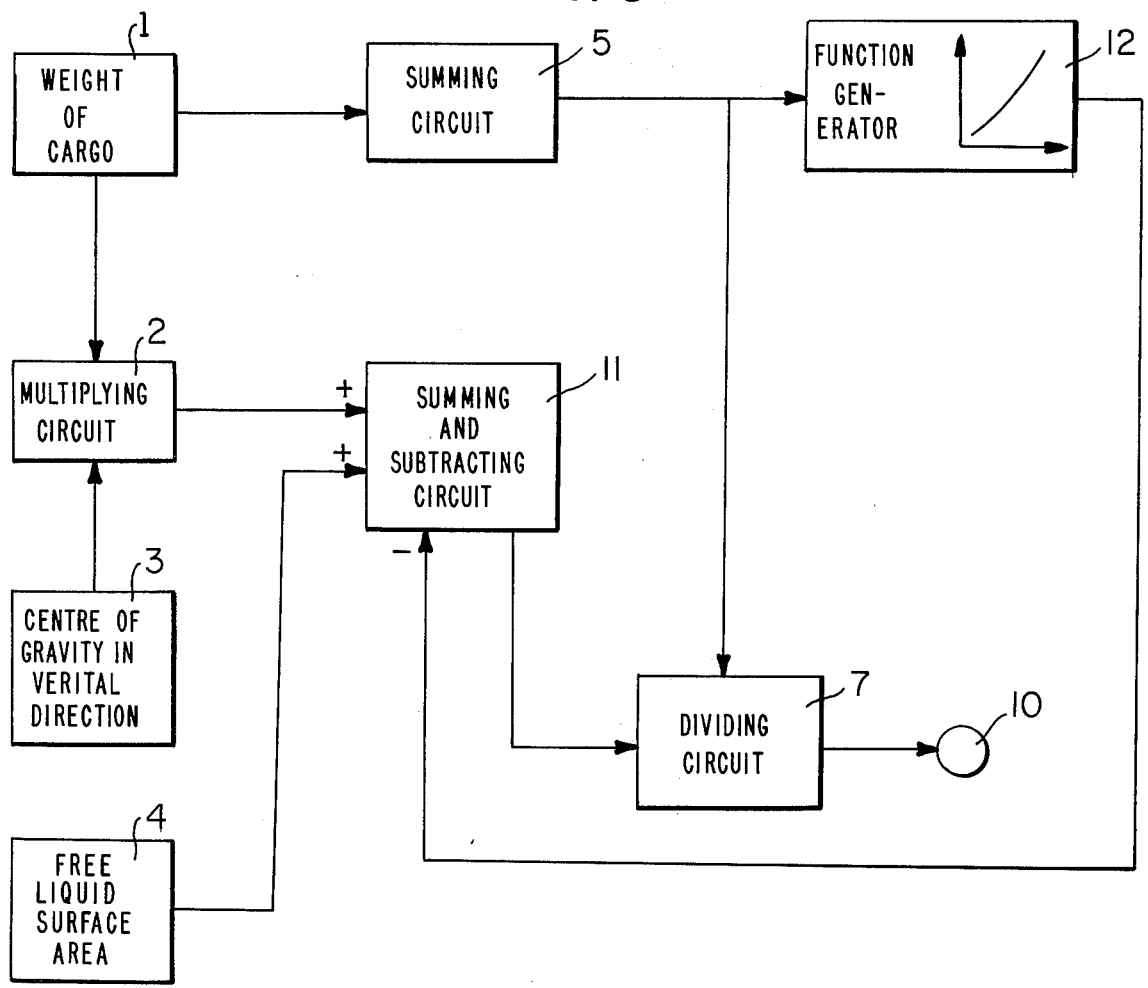
FIG. 3 is a block diagram of a further embodiment.
Figure 2:
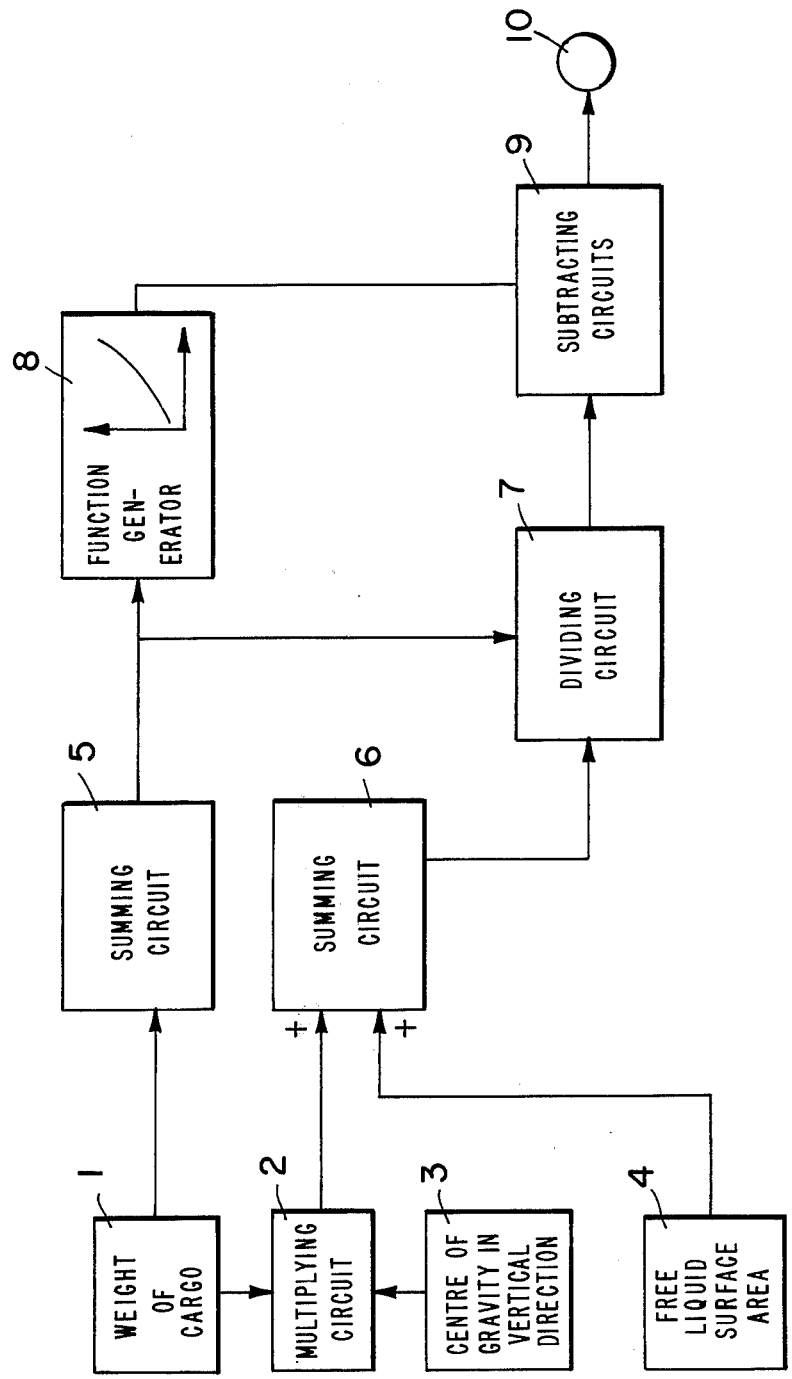
FIG. 2 is a block diagram of an embodiment of an apparatus for carrying the invention into effect.

FIG. 1 shows how the different points are located in a ship's section. FIGS. 2 and 3 show two different embodiments of an apparatus for carrying the method of the present invention into effect. Like parts of the two embodiments are identified by like reference numerals.

For each space in a ship there is provided a circuit 1 for generating a signal representing the weight of the cargo within the space, a circuit 3 for generating a signal representing the height above the keel of the center of gravity of the cargo in the vertical direction, and a circuit 4 generating a signal representing free liquid surface area. Circuits 1 and 3 are connected to a circuit 2 for multiplying the signal from circuit 1 by the signal from circuit 3, to generate a signal representing the vertical moment of the space. Furthermore, the cicrcuit 1 is connected with a summing circuit 5 for generating a signal representing the ship's displacement. The multiplying circuit 2 is connected to a summing circuit 6 for summing the vertical moments of all of the spaces and correcting this sum by means of any signals from circuits 4.

The circuit 6 thus provides an output signal representing VM+i which is the total vertical moment of the deadweight, corrected for any free liquid surface area. This signal is supplied to a dividing circuit 7 which divides the signal from circuit 6 by a signal from circuit 5, representing the ship's displacement. The output signal from the dividing circuit 7 represents the quantity C + D in equation (1). The subtracting circuit 9 furthermore receives a signal from a function generator 8, to the input of which there is applied the output signal from the circuit 5, while the output of said function generator produces a signal representing the quantity of A − B in equation (1). The subtration of the parentheses according to equation (1) thus is carried out in the subtracting circuit 9, and on the output from said circuit there is obtained a signal which represents the metacentric height GM and which is indicated by means of a suitable instrument 10.

The embodiment, shown in FIG. 3, of an apparatus for carrying the method according to the present invention into effect substantially corresponds to the embodiment according to FIG. 2, except that the circuits 6 and 8 have been replaced by new circuits 11 and 12. Also in this case, the circuit 12 is a function generator and generates a signal representing (A − B) multiplied by the ship's displacement Δ. This signal is supplied to the circuit 11 which, like the circuit 6, sums up the vertical moments of all of the spaces and corrects the sum with respect to any signal from any one of the circuits 4. In the circuit 11, however, there occurs also a subtraction of the signal representing the corrected vertical moment from the signal obtained from the circuit 12. Like the output signal from the circuit 6, the output signal from the circuit 11 is supplied to the dividing circuit 7, and after division by the signal from the circuit 5, which represents the ship's displacement, the quotient-representing signal is indicated on the instrument 10.

The method of the present invention thus makes it possible constantly to supervise the athwartship stability of a ship with respect to the cargo, and also to simulate any cargo alternative whatever. This is, of course, of invaluable assistance to the ship's officers planning the different cargo routes and the cargo distribution.

The present invention may well be combined with known electronic and electromechanical aids for calculating the bending and shear force stresses in a ship since it is possible to obtain from such aids the same signals as from the circuits 1 and 5, for which reason these circuits need not be doubled if the said aid is to be combined with the present invention.

What we claim and desire to secure by Letters Patent is:

1. A system for establishing the athwartship stability of a ship with respect to the cargo in each cargo space, the centre of gravity of the cargo and the free surface area of any liquid in a space, said system comprising means for generating for each space a first signal representing the weight of cargo within said space, means generating a second signal representing the centre of gravity of the cargo in the vertical direction, and means generating a third signal representing free liquid surface area and generated only when the cargo within the space is a liquid cargo having a free surface area, means supplying said first signals to a summing circuit for generating a signal representing the displacement of the ship and to a multiplying circuit together with said second signals for generating signals representing the vertical moments of the respective cargoes, means supplying said vertical moment signals to a second summing circuit and means adding thereto third signals for generating a signal representing the total vertical deadweight moment modified by said third signals with respect to free liquid area, when generated, means supplying last said generated signal to a subtracting circuit together with a signal representing the metacentric position of the ship above the keel line, multiplied by the displacement of the ship minus the lightweight moment of the ship, from said second summing circuit, means supplying the difference signal on the output of the subtracting circuit to a dividing circuit together with a signal representing the displacement of the ship therein to generate a quotient signal representing the metacentric height and thus the athwartship stability of the ship.

2. A system as claimed in claim 1, wherein said signal representing the total vertical deadweight moment modified with respect to free liquid surface area, is supplied to a dividing circuit together with the signal representing the displacement of the ship, to generate a quotient signal supplied to a subtracting circuit together with a signal representing the position of the ship's metacentric height above the keel line minus the lightweight moment divided by the displacement, whereupon the difference signal on the output of the subtracting circuit represents the metacentric height and thus the athwartship stability of the ship.

* * * * *